3,010,473
WINDSHIELD WASHING DEVICE
William Robert McCurnin, 1503 10th, Des Moines, Iowa
Filed Mar. 20, 1958, Ser. No. 722,731
1 Claim. (Cl. 137—353)

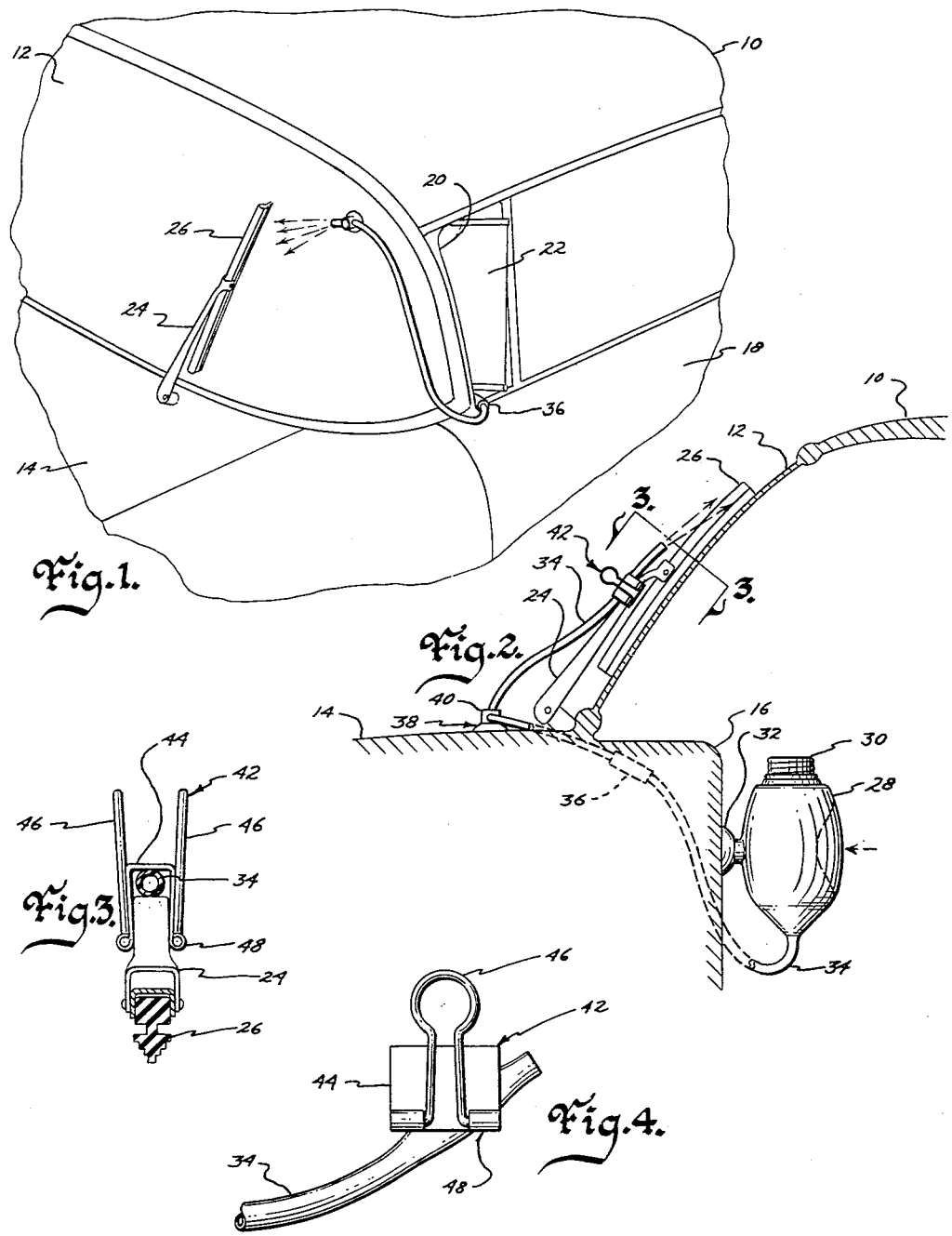

My invention relates to window washing equipment and more particularly to a device used in the washing of automobile windshields.

Many modern automobiles are equipped with devices which can deliver a quantity of liquid to the outside surface of the glass windshield to assist the conventional reciprocating windshield wiper blades in the cleaning of the windshield. All of these devices known to me are built into the structure of the car and are quite expensive. One disadvantage of these windshield washers known to me is that they often become clogged with dirt and the like because a part of their structure is permanently located on the outside of the automobile.

A further disadvantage of the windshield washers known to me is that the spray of the liquid is not always directed to the portion of the windshield where it will do the most good, and the spray cannot completely cover the wiping area of the blade. Also, once the direction of the spray has been determined, it can never be changed.

Therefore, the principal object of my invention is to provide an inexpensive windshield washing device which can be detachably mounted on any automobile.

A further object of my invention is to provide a windshield washing device which is substantially free from the clogging effects of dirt and the like.

A still further object of my invention is to provide a windshield washing device that can deliver a quantity of liquid to the entire wiping area of the windshield wiper blades.

A still further object of my invention is to provide a windshield washing device that can have the direction of its spray adjusted.

A still further object of my invention is to provide a windshield washing device that will lend itself to attachment on any automobile by utilizing conventional elements common to all automobiles.

A still further object of my invention is to provide a windshield washing device that is durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a partial perspective view of the windshield of an automobile showing one possible relationship between my device and the conventional reciprocating windshield wiper;

FIG. 2 is a sectional view taken through the front cowling of an automobile and shows my device in a second possible relationship to the windshield wiper;

FIG. 3 is a sectional view of my device taken on line 3—3 of FIG. 2; and

FIG. 4 is a side elevational view of the clip element on my device in a position to seal the tube element when the unit is not being used.

I have used the numeral 10 to generally designate an automobile having a windshield 12, hood 14, dashboard 16, front door 18, front door window frame 20, and a front door wing window 22 pivotally mounted within window frame 20. A conventional reciprocating windshield wiper arm 24 is mounted on the hood or cowling 14 and wiper blade 26 is conventionally mounted thereon, as shown in FIGS. 1 and 2. The structure thus far described is typical of all modern day automobiles and does not comprise a part of my invention.

The numeral 28 designates a resilient liquid container which may be constructed of plastic, rubber, or any similar material. A removable cap 30 is threadably mounted in the top of container 28. A suction cup 32 extends from one side of container 28 and can be used to mount the container on the dashboard of an automobile, as shown in FIG. 2. Flexible tube 34 has one of its ends secured in any convenient manner to the bottom of container 28. Hollow metal sleeve 36 slidably embraces tube 34. The numeral 38 designates a suction cup with head portion 40 having a suitable aperture through which tube 34 slidably extends.

Clip 42 is comprised of an inverted U-shaped spring band 44 and gripping elements 46 are secured in any convenient manner to the lower ends 48 of spring band 44. The clip 42 is designed so that the tendency of the lower ends 48 of spring band 44 is to close upon each other. The spring band 44 and tube 34 are of such relative size that tube 34 can always loosely rest within clip 42 as long as it remains immediately underneath the top portion of the spring band. This relationship between tube 34 and clip 42 is clearly shown in FIG. 3.

The normal operation of my device is as follows: A cleaning liquid can easily be placed in resilient container 28 by means of cap 30. Tube 34 can be sealed when my device is not being used by placing the tube between the lower ends 48 of spring band 44, as shown in FIG. 4. Thus, my device can easily be kept in the glove compartment of an automobile without fear of the cleaning liquid departing from container 28.

When it is desired to place my device in operating position, the container 28 can be secured to the dashboard 16 by suction cup 32. Wing window 22 is then opened and tube 34 is threaded through the window frame 20. Sleeve 36 is slidably moved on tube 34 to a point where the tube passes through the window frame 20 and window 22 is thereupon closed upon the sleeve to bind the sleeve and the tube between the window and window frame. The metal sleeve prevents this binding action from sealing tube 34 but permits the window 22 and window frame 20 to secure the tube 34 therebetween.

If the operator desires to utilize my device, as shown in FIG. 1, the suction cup 38 is slidably moved to a point near the outer end of tube 34 and the suction cup is then anchored to the windshield in any position that the operator may desire. Of course, any position could be used to direct the spray from tube 34 in any desired direction. Having so mounted my device, the clip 42 can be removed from its sealing engagement with tube 34 and the cleaning liquid can be discharged from container 28 and tube 34 by manually compressing the resilient container. Of course, the manual pressure on the walls of the container acting upon the liquid will force the liquid out of tube 34. Any air in the top of container 28 will also act upon the liquid when compression of the container takes place.

A second possible way to utilize my device is to take advantage of the clip 42 and secure tube 34 to wiper arm 24. This is best accomplished by slidably moving suction cup 38 away from the outer end of tube 34 and then anchoring the cup and tube to hood 14 somewhere in the near proximity of the lower end of wiper arm 24. Tube 34 is thereupon moved to within the upper portion of spring band 44, as shown in FIG. 3, and the lower ends 48 of the spring band are permitted to forcibly engage the sides of wiper arm 24. As shown in FIG. 2, the outer end of tube 34 preferably should terminate at a point below the upper portion of wiper blade 26. When my device is so mounted, the liquid discharged from the end of tube 34 will always be directed to the exact area then being cleaned by the wiper blade 26. Furthermore, the reciprocating wiper arm 24 will enable the spray from tube 34 to be carried completely over the wiping area of the blade 26.

From the foregoing, it will be seen that my invention will accomplish at least all of its stated objectives.

Some changes may be made in the construction and arrangement of my windshield washing device without departing from the real spirit and purpose of my invention, and it is my intention to cover by my claim, any modified forms of structure or use of mechanical equivalents which may be reasonably included within their scope.

I claim:

In a windshield washing device, a resilient container, a hollow flexible tube secured by one of its ends to said container, the interior of said hollow flexible tube communicating with the interior of said container, a securing means having an aperture, the other end of said tube slidably extending through the aperture in said securing means, said securing means adapted to detachably hold the other end of said tube to a vehicle body; said securing means being capable of being slidably moved to substantially any point on the length of said tube by threading said tube through said aperture, a clip means mounted on the outer end of said tube, and two yieldable spring actuated gripping elements on said clip means normally closed upon each other; said tube being located between said gripping elements said gripping elements being of such size that they can freely embrace or forcibly seal said tube when closed upon each other as the position of said tube between said gripping elements is varied.

References Cited in the file of this patent

UNITED STATES PATENTS

| | | |
|---|---|---|
| 1,448,508 | Thium | Mar. 13, 1923 |
| 1,546,992 | Oppman | July 21, 1925 |
| 1,661,704 | Osborne | Mar. 6, 1928 |
| 1,780,800 | Shekter | Nov. 4, 1930 |
| 1,795,964 | O'Connor | Mar. 10, 1931 |
| 1,931,605 | Dupius | Oct. 24, 1931 |
| 1,933,122 | Sanborn | Oct. 31, 1933 |
| 2,024,429 | Casey | Dec. 17, 1935 |
| 2,072,345 | Schneider | Mar. 2, 1937 |
| 2,105,676 | Stow | Jan. 18, 1938 |
| 2,632,911 | Deibel | Mar. 31, 1953 |
| 2,763,023 | Horton | Sept. 18, 1956 |

FOREIGN PATENTS

| | | |
|---|---|---|
| 754,277 | Great Britain | Aug. 8, 1953 |